United States Patent
Bushman et al.

(10) Patent No.: US 10,078,525 B2
(45) Date of Patent: *Sep. 18, 2018

(54) EXPOSING A PROPRIETARY IMAGE BACKUP TO A HYPERVISOR AS A DISK FILE THAT IS BOOTABLE BY THE HYPERVISOR

(71) Applicant: STORAGECRAFT TECHNOLOGY CORPORATION, Draper, UT (US)

(72) Inventors: Nathan S. Bushman, Pleasant Grove, UT (US); Lee Carl Bender, Jr., Lindon, UT (US)

(73) Assignee: STORAGECRAFT TECHNOLOGY CORPORATION, Draper, UT (US)

( * ) Notice: Subject to any disclaimer, the term of this patent is extended or adjusted under 35 U.S.C. 154(b) by 570 days.

This patent is subject to a terminal disclaimer.

(21) Appl. No.: 14/710,357

(22) Filed: May 12, 2015

(65) Prior Publication Data

US 2016/0216990 A1    Jul. 28, 2016

Related U.S. Application Data

(63) Continuation of application No. 14/605,699, filed on Jan. 26, 2015, now Pat. No. 9,075,649.

(51) Int. Cl.
*G06F 9/44* (2018.01)
*G06F 9/455* (2018.01)
*G06F 9/4401* (2018.01)

(52) U.S. Cl.
CPC ........ *G06F 9/45558* (2013.01); *G06F 9/4401* (2013.01); *G06F 9/4406* (2013.01);
(Continued)

(58) Field of Classification Search
CPC .... G06F 3/0619; G06F 3/0632; G06F 3/0643; G06F 3/0664; G06F 3/065; G06F 3/0667;
(Continued)

(56) References Cited

U.S. PATENT DOCUMENTS 6,549,918 B1    4/2003  Probert, Jr. et al.
8,332,689 B2   12/2012  Timashev et al.
(Continued)

FOREIGN PATENT DOCUMENTS

EP    2488946    8/2012
EP    2580662    4/2013
(Continued)

OTHER PUBLICATIONS

"Veeam vPower NFS Service" by Veeam Help Center as of Apr. 22, 2014, accessed from http://helpcenterveeam.com/backup/70/vsphere/vpower_nfs_service.html on Aug. 22, 2014.

Bill Oliver, "Symantec NetBackup 7.6 Claims 400× Faster VM Recovery", Web Article, Jan. 23, 2014, Toms IT Pro, accessed Sep. 30, 2014, http://www.tomsitpro.com/articles/symantec-netbackup-backup-vmware-recovery,1-1599.html.

"NetBackup Instant Recovery for Vmware", Online Discussion Forum Post, Feb. 13, 2014, Symantec, accessed Sep. 30, 2014, http://www.symantec.com/connect/forums/netbackup-instant-recov.

(Continued)

*Primary Examiner* — Gary J Portka
(74) *Attorney, Agent, or Firm* — Maschoff Brennan

(57) ABSTRACT

Exposing a proprietary image backup to a hypervisor as a disk file that is bootable by the hypervisor. In one example embodiment, a method of exposing a proprietary image backup to a hypervisor as a disk file that is bootable by the hypervisor may include identifying the proprietary image backup having a proprietary format and storing an operating system, identifying a plugin file corresponding to the proprietary image backup, reconfiguring the operating system to cause the operating system to be bootable when using hardware emulated by the hypervisor, gathering operating system data from the proprietary image backup, reformatting the operating system data into a native format of the hypervisor, and booting the operating system in a virtual machine of the hypervisor.

19 Claims, 4 Drawing Sheets

(52) U.S. Cl.
CPC ............ *G06F 2009/4557* (2013.01); *G06F 2009/45575* (2013.01)

(58) Field of Classification Search
CPC .... G06F 3/0689; G06F 9/441; G06F 9/44505; G06F 9/44526; G06F 9/4555; G06F 9/45554; G06F 9/45558; G06F 2009/4557
USPC .................................. 707/823; 711/6; 713/2
See application file for complete search history.

(56) References Cited

U.S. PATENT DOCUMENTS

| | | | |
|---|---|---|---|
| 8,370,835 | B2 | 2/2013 | Dittmer |
| 8,402,309 | B2 | 3/2013 | Timashev et al. |
| 8,413,146 | B1 | 4/2013 | McCorkendale et al. |
| 8,528,107 | B1 | 9/2013 | Ginzton et al. |
| 8,566,279 | B1 | 10/2013 | Dowers, II et al. |
| 8,566,640 | B2 | 10/2013 | Timashev et al. |
| 8,745,444 | B2 | 6/2014 | Timashev et al. |
| 8,943,105 | B1 | 1/2015 | Bushman et al. |
| 9,015,129 | B2 | 4/2015 | Timashev et al. |
| 9,075,645 | B2 | 7/2015 | Bushman et al. |
| 9,311,003 | B2 | 4/2016 | Bushman et al. |
| 2010/0011014 | A1 | 1/2010 | Odulinski et al. |
| 2011/0087874 | A1 | 4/2011 | Timashev et al. |
| 2011/0196842 | A1 | 8/2011 | Timashev et al. |
| 2011/0307657 | A1 | 12/2011 | Timashev et al. |
| 2012/0017114 | A1 | 1/2012 | Timashev et al. |
| 2012/0185427 | A1 | 7/2012 | Fontignie et al. |
| 2012/0278806 | A1 | 11/2012 | Wade et al. |
| 2012/0284236 | A1 | 11/2012 | Timashev et al. |
| 2013/0212437 | A1 | 8/2013 | Timashev et al. |
| 2014/0006858 | A1 | 1/2014 | Helfman et al. |
| 2014/0047268 | A1 | 2/2014 | Timashev et al. |
| 2014/0281217 | A1 | 9/2014 | Beam et al. |
| 2014/0289566 | A1 | 9/2014 | Timashev et al. |
| 2014/0351810 | A1 | 11/2014 | Pratt et al. |
| 2014/0365740 | A1 | 12/2014 | Vasilyev et al. |
| 2015/0106802 | A1 | 4/2015 | Timashev et al. |
| 2015/0347014 | A1 | 12/2015 | Bushman et al. |
| 2016/0098204 | A1 | 4/2016 | Bushman et al. |
| 2016/0216990 | A1 | 7/2016 | Bushman et al. |

FOREIGN PATENT DOCUMENTS

| | | |
|---|---|---|
| EP | 2596426 | 5/2013 |
| JP | 5819561 | 11/2015 |
| JP | 2016006646 | 1/2016 |
| WO | 2011046813 A2 | 4/2011 |
| WO | 2011046813 A3 | 7/2011 |
| WO | 2011159701 A2 | 12/2011 |
| WO | 2012012365 A2 | 1/2012 |
| WO | 2011159701 A3 | 4/2012 |
| WO | 2012012365 A3 | 4/2012 |
| WO | 2012057942 A1 | 5/2012 |
| WO | 2011159701 A3 | 4/2014 |
| WO | 2014199230 A2 | 12/2014 |
| WO | 2014199230 A2 | 4/2015 |
| WO | 2014199230 A3 | 4/2015 |

OTHER PUBLICATIONS

"About Instant Recovery for VMware", Online Article, Oct. 2, 2013, Symantec, accessed Sep. 30, 2014, http://www.symantec.com/business/support/index?page=content&id=HOWTO92050#v75775331.

"Instant Recovery for VMware", Web Article, Aug. 2, 2013, Symantec, accessed Sep. 30, 2014, downloaded from http://kbdownload.symantec.com/resources/sites/BUSINESS/content/live/TECHNICAL_SOLUTION/211000/TECH211113/en_US/NetBackup%207.6%20Feature%20Briefing%20-%20Instant%20Recovery%20for%20VMware.pdf?___gda___=1412115174_0af0636df3aca9da6d796d34e8ca128c.

"Instant VM Recovery" by Veeam Help Center as of Jun. 3, 2014, accessed from http://helpcenter.veeam.com/backup/70/hyperv/index.html on Apr. 27, 2015.

"Instant VM Recovery" by Vembu accessed from https://www.vembu.com/features/bdr/disaster-recovery/ on Apr. 27, 2015.

U.S. Appl. No. 14/569,330, filed Dec. 12, 2014, 34 pages.

"Notice of Allowance" dated Apr. 27, 2015 for U.S. Appl. No. 14/605,699, filed Jan. 26, 2015/.

United States Patent and Trademark Office; Office Action; dated Sep. 25, 2014; 9 pages; in U.S. Appl. No. 14/293,122.

United States Patent and Trademark Office; Notice of Allowance; dated Nov. 21, 2016; 15 pages; in U.S. Appl. No. 14/293,122.

United States Patent and Trademark Office; Office Action; dated Jan. 29, 2015; 24 pages; in U.S. Appl. No. 14/569,330.

United States Patent and Trademark Office; Office Action; dated Aug. 20, 2015; 23 pages; in U.S. Appl. No. 14/569,330.

United States Patent and Trademark Office; Notice of Allowance; dated Dec. 2, 2015; 8 pages; in U.S. Appl. No. 14/569,330.

Instant VM Recovery by Vembu accessed from https://www.vembu.com/features.bdr.disaster-recovery/ on Apr. 27, 2015.

United States Patent and Trademark Office, Notice of Allowance, dated Apr. 27, 2015, 8 pages, in U.S. Appl. No. 14/605,699.

European Patent Office, European Search Report, dated Mar. 21, 2016, in application 15170362.2, 8 pages.

European Patent Office, European Search Report, dated Jun. 22, 2016, in application 15172172.7, 9 pages.

Oracle, Manger Users Guide, Release 2.2, Nov. 2009, 154 pgs.

United States Patent and Trademark Office, Office Action, dated Sep. 25, 2014, 19 pages, in U.S. Appl. No. 14/293,122.

United States Patent and Trademark Office, Notice of Allowance, dated Nov. 21, 2014, 11 pages, in U.S. Appl. No. 14/293,122.

United States Patent and Trademark Office, Office Action, dated Jan. 29, 2015, 30 pages, in U.S. Appl. No. 14/569,330.

United States Patent and Trademark Office, Final Office Action, dated Aug. 20, 2015, 27 pages, in U.S. Appl. No. 14/569,330.

United States Patent and Trademark Office, Notice of Allowance, filed Dec. 2, 2015, 8 pages, in U.S. Appl. No. 14/569,330.

United States Patent and Trademark Office, Office Action, dated Jun. 17, 2016, 12 pages, in U.S. Appl. No. 14/966,388.

United States Patent and Trademark Office, Notice of Allowance, dated Jul. 12, 2016, 8 pages, in U.S. Appl. No. 14/966,388.

EXPOSING A PROPRIETARY IMAGE BACKUP TO A HYPERVISOR AS A DISK FILE THAT IS BOOTABLE BY THE HYPERVISOR

CROSS-REFERENCE TO A RELATED APPLICATION

This application is a continuation of U.S. patent application Ser. No. 14/605,699, filed Jan. 26, 2015, and titled "EXPOSING A PROPRIETARY IMAGE BACKUP TO A HYPERVISOR AS A DISK FILE THAT IS BOOTABLE BY THE HYPERVISOR," which is incorporated herein by reference in its entirety.

FIELD

The embodiments disclosed herein relate to exposing a proprietary image backup to a hypervisor as a disk file that is bootable by the hypervisor.

BACKGROUND

Physical computers, also known as physical machines, face a myriad of threats to their smooth and continuous operation, including threats to the data stored in storages of the physical machines. A storage is computer-readable media capable of storing data. In order to mitigate these threats, a backup of the data in a storage may be created at a particular point in time to enable the restoration of the data at some future time. Such a restoration may become desirable, for example, if the storage experiences corruption of its stored data, if the storage becomes unavailable, or if a user wishes to create a second identical storage.

When a user desires to restore the storage of a physical machine from a backup, the restoration to a storage on a new physical machine can involve a number of challenges, including taking an unacceptable amount of time. In order to shorten the amount of time it takes to restore the storage of a physical machine from a backup, a user may restore the backup to a virtual storage on a virtual machine.

A virtual machine is a software-based emulation of a physical machine in a process generally known as virtualization. A virtual machine generally operates based on the computer architecture and functions of a physical machine. A hypervisor is computer software, computer firmware, or computer hardware that creates and runs virtual machines. A computer on which a hypervisor is running one or more virtual machines is generally referred to as a host machine, while each virtual machine running on the hypervisor is generally referred to as a guest virtual machine. A hypervisor generally creates a guest virtual machine by accessing a disk file that is bootable by the hypervisor and that contains or references data that is used to create the guest virtual machine. The hypervisor also generally presents the guest virtual machine with a virtual operating platform and manages the execution of an operating system of the guest virtual machine.

One common problem encountered when utilizing a hypervisor is that some hypervisors are only designed to access disk files that have a particular file format that is native to the hypervisor. For example, Microsoft Hyper-V® hypervisors are designed to only be capable of accessing disk files having the VHD and VHDX file formats, which are the native file formats for Microsoft® Hyper-V® hypervisors, for the purpose of creating a guest virtual machine. In particular, Microsoft Hyper-V® technology lacks disk plugin application programming interfaces (APIs) which are necessary to enable third parties to quickly attach disk data from their own disk image formats into Microsoft® Hyper-V® hypervisors for access by virtual machines. This inability of some hypervisors to access a variety of differently-formatted disk files, due to a lack of disk plugin APIs for example, limits the disk files that can be used to create virtual machines using these hypervisors.

Another common problem encountered when utilizing a hypervisor is that often the hardware configuration emulated by a hypervisor is different from the hardware configuration of an operating system stored in a backup. Therefore, when the backup is restored to a virtual storage on a virtual machine, the hardware configuration of the restored operating system may be incompatible with the hardware configuration of the virtual machine, making it difficult or impossible to boot the operating system in the virtual machine. Further, the backup may also be missing disk-centric data that is used in booting the operating system due to the backup only including data from a portion of a disk, such as a partition or a volume of the disk, which may also make it difficult or impossible to boot the operating system in the virtual machine.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to exposing a proprietary image backup to a hypervisor as a disk file that is bootable by the hypervisor. The example methods disclosed herein may be employed to allow a hypervisor on a host machine to create a guest virtual machine by reconfiguring an operating system stored in a proprietary backup to be bootable using hardware emulated by the hypervisor and then booting the reconfigured operating system, even where the hypervisor is designed to only be capable of creating guest virtual machines using disk files formatted in the native format of the hypervisor, and even where the hardware configuration emulated by the hypervisor is different from the hardware configuration of the operating system stored in the proprietary backup. The example methods disclosed herein may therefore enable a hypervisor to access and boot an operating system of a proprietary backup in a virtual machine.

In one example embodiment, a method of exposing a proprietary image backup to a hypervisor as a disk file that is bootable by the hypervisor may include identifying the proprietary image backup having a proprietary format and storing an operating system, identifying a plugin file corresponding to the proprietary image backup, reconfiguring the operating system to cause the operating system to be bootable when using hardware emulated by the hypervisor, gathering operating system data from the proprietary image backup, reformatting the operating system data into a native format of the hypervisor, and booting the operating system in a virtual machine of the hypervisor.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

The phrase "native hypervisor disk file" as used herein refers to a virtual machine disk file having a file format that is native to a particular hypervisor. An example is the VHDX file format used by Microsoft® Hyper-V® hypervisors. Another example is the VMDK file format used by VMware® hypervisors. The phrase "proprietary file format" as used herein refers to a file format which is not natively understood by a particular hypervisor. The phrase "proprietary image backup" as used herein refers to a file, or data storage system such as a deduplication vault or database, which contains an image-based backup of at least a portion of a partition or volume of a storage and which is structured in a proprietary file format. An example is the StorageCraft® ShadowProtect® Full (SPF) image backup file format. The phrase "plugin file" as used herein refers to a file corresponding to a native hypervisor disk file which is recognizable by a filter module and which appears to be a native hypervisor disk file to the operating system, the hypervisor, and to all other applications due to the filtering functionality provided by a filter module. This file generally points to the proprietary disk file and is generally much smaller in size that a corresponding real native hypervisor disk file would be. An example would be a file named "vm.vhdx" which, because of its "vhdx" file extension, and due to the filtering activity of a filter module, appears to be a Microsoft® Hyper-V® VHDX native hypervisor disk file, but in reality does not necessarily contain the typical content or structure of a native hypervisor disk file, and rather is in reality a plugin file that points to a corresponding SPF proprietary image backup file named "vm.spf" that is separate from the plugin file. The phrase "plugin file format" as used herein refers to a file format of a plugin file which is different from the native hypervisor disk file format of the native hypervisor disk file to which the plugin file corresponds, because the structure of the plugin file format is different from the native hypervisor disk file format and/or because at least some portion of the data that would typically be stored in the plugin file (having the same structure as the native hypervisor disk file format) is stored elsewhere. From the example above, the plugin file "vm.vhdx" would have a plugin file format structure that is different from the native hypervisor disk file format structure of VHDX native hypervisor disk files. In another example, a plugin file named "vm2.vhdx" could have a plugin file format structure that is the same as the VHDX native hypervisor disk file format structure, but the "vm2.vhdx" plugin file could be missing some data that would typically be stored in the native hypervisor disk file but is instead retrievable from a corresponding SPF proprietary image backup file named "vm2.spf" using a filter module.

Figure 1:
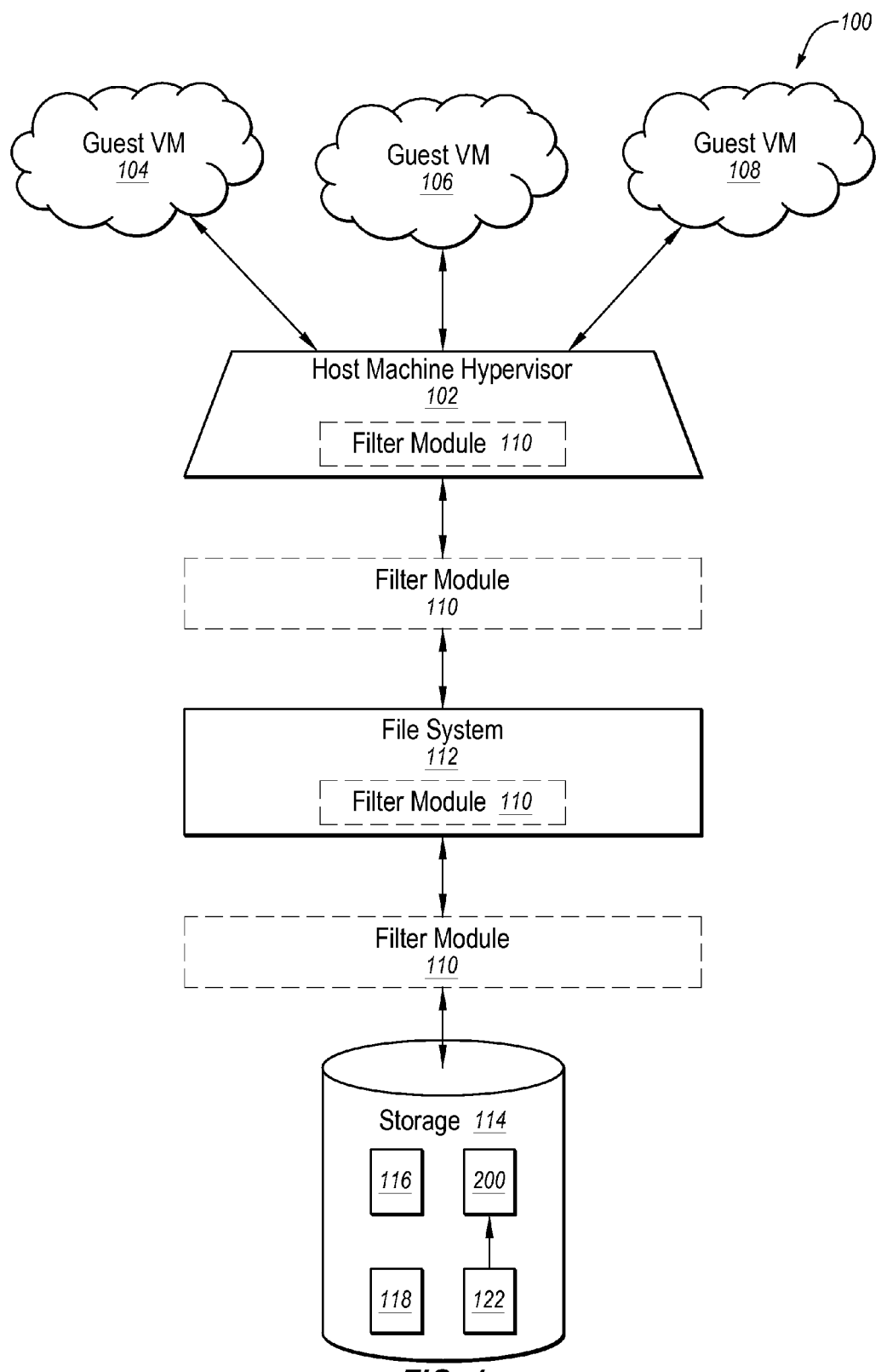
FIG. 1 is a schematic block diagram illustrating an example hypervisor system including a hypervisor.

FIG. 1 is a schematic block diagram illustrating an example hypervisor system 100. As disclosed in FIG. 1, the system 100 may include a host machine hypervisor 102, multiple guest virtual machines (VMs) 104, 106, and 108, a filter module 110, a file system 112, and a storage 114. The storage 114 may include native hypervisor disk files 116 and 118, a proprietary image backup file 200, and a plugin file 122. The file system 112 may be a local file system, a network file system, a virtual file system, or other type of file system.

The hypervisor 102 may be computer software, computer firmware, or computer hardware of a host machine (not shown) that is configured to create, run, and manage one or more guest virtual machines, such as the guest virtual machines 104, 106, and 108. The virtual machines 104, 106, and 108 may be virtual machines that are created by, run by, and managed by the hypervisor 102. Each of the virtual machines 104, 106, and 108 may be a software-based emulation of a physical machine (e.g., a physical computer) that is configured to execute programs like the physical machine.

The creation of each of the virtual machines 104, 106, and 108 may be achieved by the hypervisor 102 accessing a disk file or image backup in the storage 114. In particular, the hypervisor 102 may create the virtual machine 104 by accessing the native hypervisor disk file 116, which has the native file format of the hypervisor 102. Similarly, the hypervisor 102 may create the virtual machine 106 by accessing the native hypervisor disk file 118, which also has the native file format of the hypervisor 102.

In contrast, the hypervisor 102 may create the virtual machine 108 by the filter module 110 exposing the proprietary image backup file 200 to the hypervisor 102. The proprietary image backup file 200 has a file format which is not natively understood by the hypervisor 102. In addition, the proprietary image backup file 200 may store an operating system that is not configured to be bootable when using hardware emulated by the hypervisor 102. Although the hypervisor 102 is not capable of directly accessing the proprietary image backup file 200 due to the proprietary image backup file 200 having a file format that is not natively understood by the hypervisor 102, and although the hypervisor 102 is not capable of booting the operating system of the proprietary image backup file 200 due to the operating system not being configured to be bootable when using hardware emulated by the hypervisor 102, the methods disclosed herein may enable the filter module 110 to reconfigure the operating system and expose the proprietary image backup file 200 to the hypervisor 102 in the native file format of the hypervisor 102 in order for the hypervisor 102 to boot the operating system in the virtual machine 108.

As disclosed in FIG. 1, the filter module 110 may be configured to operate at various levels in the system 100. For example, the filter module 110 may function as a file system filter module that is configured to operate between the hypervisor 102 and the file system 112, either as a stand-alone file system filter module, or as a file system filter module that is partially or totally integrated into the hypervisor 102 or the file system 112, as disclosed in FIG. 1. Additionally or alternatively, the filter module 110 may function as a block level filter module that is configured to operate between the file system 112 and the storage 114, either as a stand-alone block level filter module, or as a block level filter module that is partially or totally integrated into the file system 112, as disclosed in FIG. 1. Additionally or alternatively, the filter module 110 may function as a stand-alone file system module that is configured to operate between the file hypervisor 102 and the storage 114, as disclosed in FIG. 1. Therefore, the filter module 110 is not limited to operation at any particular level in the system 100.

In one example embodiment, the hypervisor 102 may be a Microsoft® Hyper-V® hypervisor, and the proprietary image backup file 200 may be a StorageCraft® ShadowProtect® Full (SPF) image backup file. Using the example methods disclosed herein, the Microsoft® Hyper-V® hypervisor may create the virtual machine 108 using the SPF image backup file and/or using the corresponding plugin file 122, even though the SPF image backup file format is not natively understood by the Microsoft® Hyper-V® hypervisor. This is accomplished by the filter module 110 reconfiguring the operating system stored in the SPF image backup file to cause the operating system to be bootable when using hardware emulated by the Microsoft® Hyper-V® hypervisor and then intercepting each request sent from the Microsoft® Hyper-V® hypervisor to the SPF image backup file and/or to the plugin file 122, and responding to the request in such a way that the SPF image backup file and/or the plugin file appears to be a valid VHDX file, which is a native hypervisor disk file for Microsoft® Hyper-V® hypervisors. In this manner, even though the Microsoft® Hyper-V® hypervisor is not capable of directly accessing the SPF image backup file due to the SPF image backup file having a file format that is not natively understood by the Microsoft® Hyper-V® hypervisor, the methods disclosed herein enable the filter module 110 to reconfigure the operating system and expose the SPF image backup file to the Microsoft® Hyper-V® hypervisor in the native VHDX file format of the Microsoft® Hyper-V® hypervisor to enable the booting of the operating system in a virtual machine.

Although only a single storage is disclosed in the system 100 of FIG. 1, it is understood that the system 100 may instead include two or more storages. Further, although the storage 114 is disclosed in FIG. 1 being local to the hypervisor 102, it is understood that the storage 114 may be remote from the hypervisor 102. Further, one or more of the files 116, 118, 200, and 122 may be stored remotely from the hypervisor 102. For example, the plugin file 122 may be stored locally to the hypervisor 102 while the proprietary image backup file 200 is stored remotely from the hypervisor 102. Further, although the filter module 110 is the only filter module disclosed in the system 100 of FIG. 1, it is understood that the functionality of the filter module 110 may be replaced or augmented by one or more similar filter modules, or any other executable modules, residing in the system 100 or in another system that is local to or remote from the system 100. Additionally, the proprietary image backup file 200 may not be an actual file but may instead be any other data storage system such as a deduplication vault or database, which contains disk data and which is structured in a proprietary file format.

Having described one specific environment with respect to FIG. 1, it is understood that the specific environment of FIG. 1 is only one of countless environments in which the example methods disclosed herein may be employed. The scope of the example embodiments is not intended to be limited to any particular environment.

Figure 2:
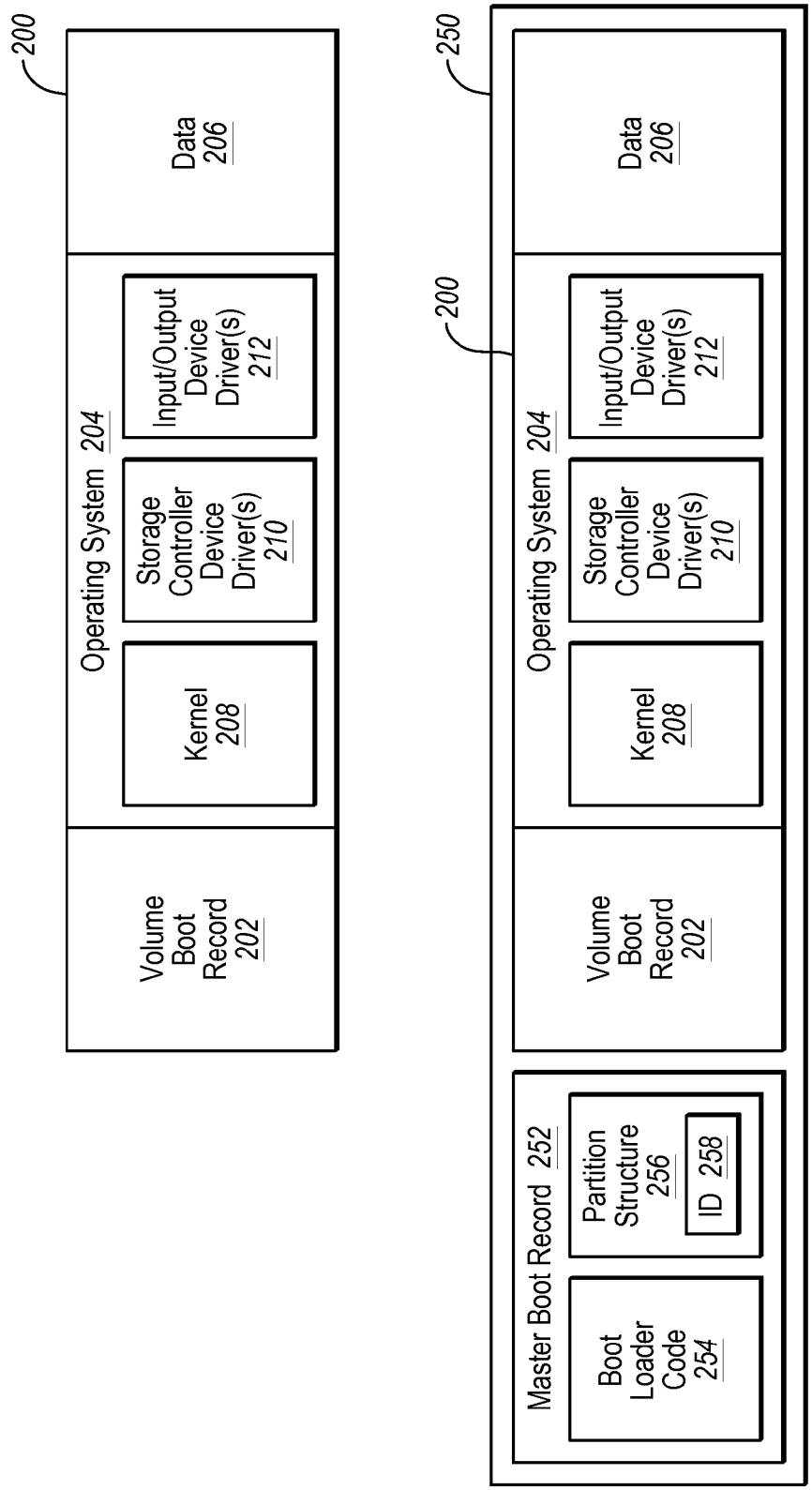
FIG. 2 is a schematic block diagram illustrating an example proprietary image backup file before and after the reconfiguring of the proprietary image backup file to cause an operating system of the proprietary image backup file to be bootable when using hardware emulated by the hypervisor of FIG. 1.

FIG. 2 is a schematic block diagram illustrating the example proprietary image backup file 200 before and after the reconfiguring of the proprietary image backup file 200 to cause an operating system of the proprietary image backup file 200 to be bootable when using hardware emulated by the hypervisor 102 of FIG. 1.

As disclosed in FIG. 2, the proprietary image backup file 200 may originally include a volume boot record 202, an operating system 204, and data 206. The operating system may include a kernel 208, storage controller device driver(s) 210, and input/output device driver(s) 212. It is understood that the operating system may include additional components beyond what is illustrated in FIG. 2.

Also disclosed in FIG. 2, after the reconfiguring of the proprietary image backup file 200 to cause an operating system of the proprietary image backup file 200 to be bootable when using hardware emulated by the hypervisor 102 of FIG. 1, the proprietary image backup file 200 may be included in a reconfigured disk file 250 that may additionally include a master boot record (MBR) 252. The MBR 252 may include boot loader code 254 and a partition structure 256. The partition structure 256 may include an identifier 258. The identifier 258 may be a "disk signature" having a four-byte value that is randomly generated and written to the MBR 252 when the disk is first partitioned.

As discussed in greater detail below in connection with FIGS. 3A-3B, during the reconfiguring of the proprietary image backup file 200, the hardware configuration of the operating system 204 may be reconfigured to be compatible with the hardware configuration emulated by the hypervisor 102 of FIG. 1. This reconfiguration may include changes to the kernel 208, the storage controller device driver(s) 210, the input/output device driver(s) 212, or some combination thereof. This reconfiguration may also include changes to the operating system-specific portions of the volume boot record 202, data 206, or some combination thereof. In addition, since the proprietary image backup file 200 is missing disk-centric data that is used in booting the operating system 204 due to the proprietary image backup file 200 only including data from a portion of a disk, such as a partition or a volume of the disk, this reconfiguration may additionally or alternatively include the addition of the disk-centric MBR 252 which may include operating system-specific portions. Therefore, this reconfiguration may enable the proprietary image backup file 200 to be restored to a virtual storage on the virtual machine 108 of FIG. 1 and then the operating system 204 to be booted in the virtual machine 108.

Figure 3A:
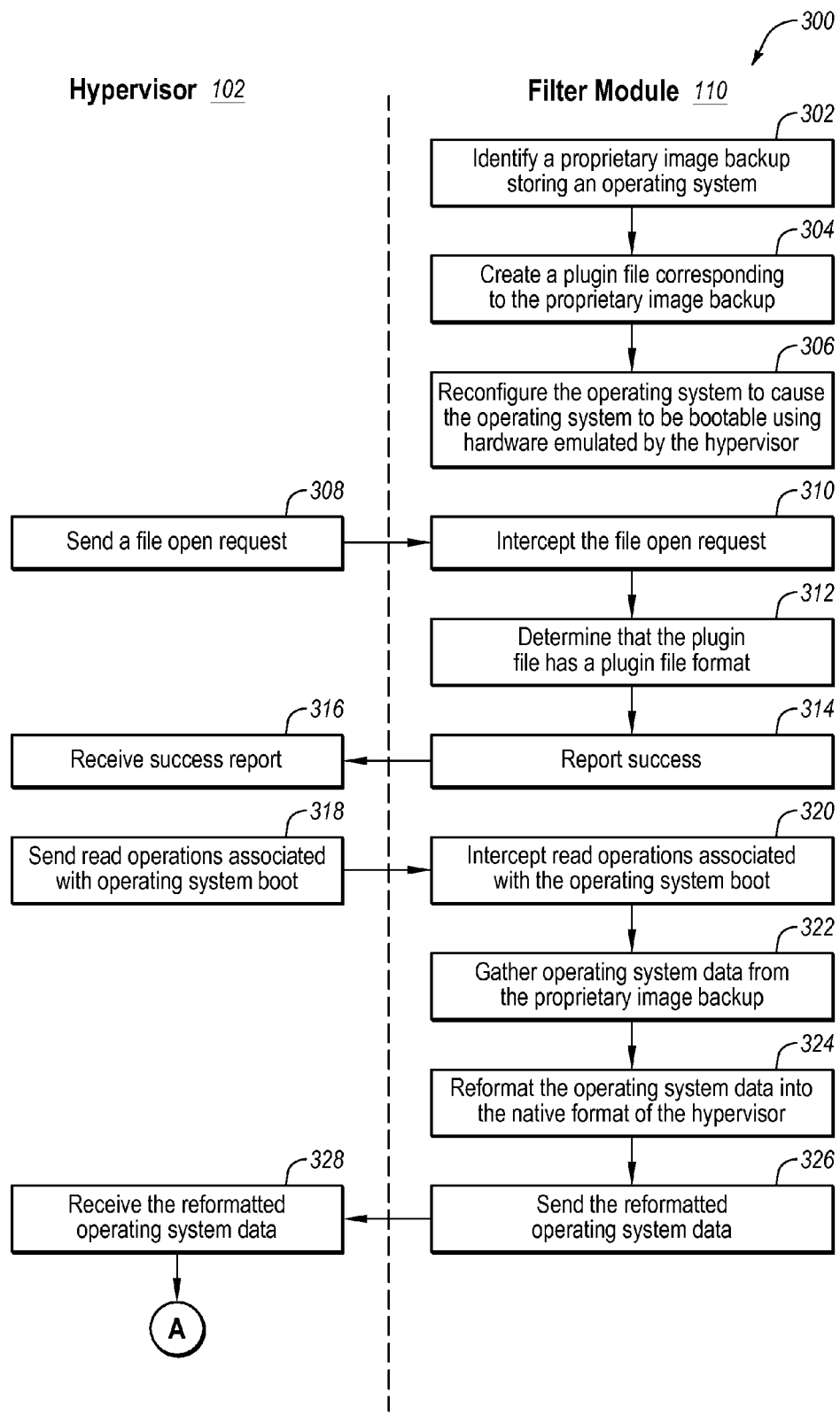
FIGS. 3A-3B are a schematic flowchart diagram of an example method of exposing a proprietary image backup to a hypervisor as a disk file that is bootable by the hypervisor.
Figure 3B:
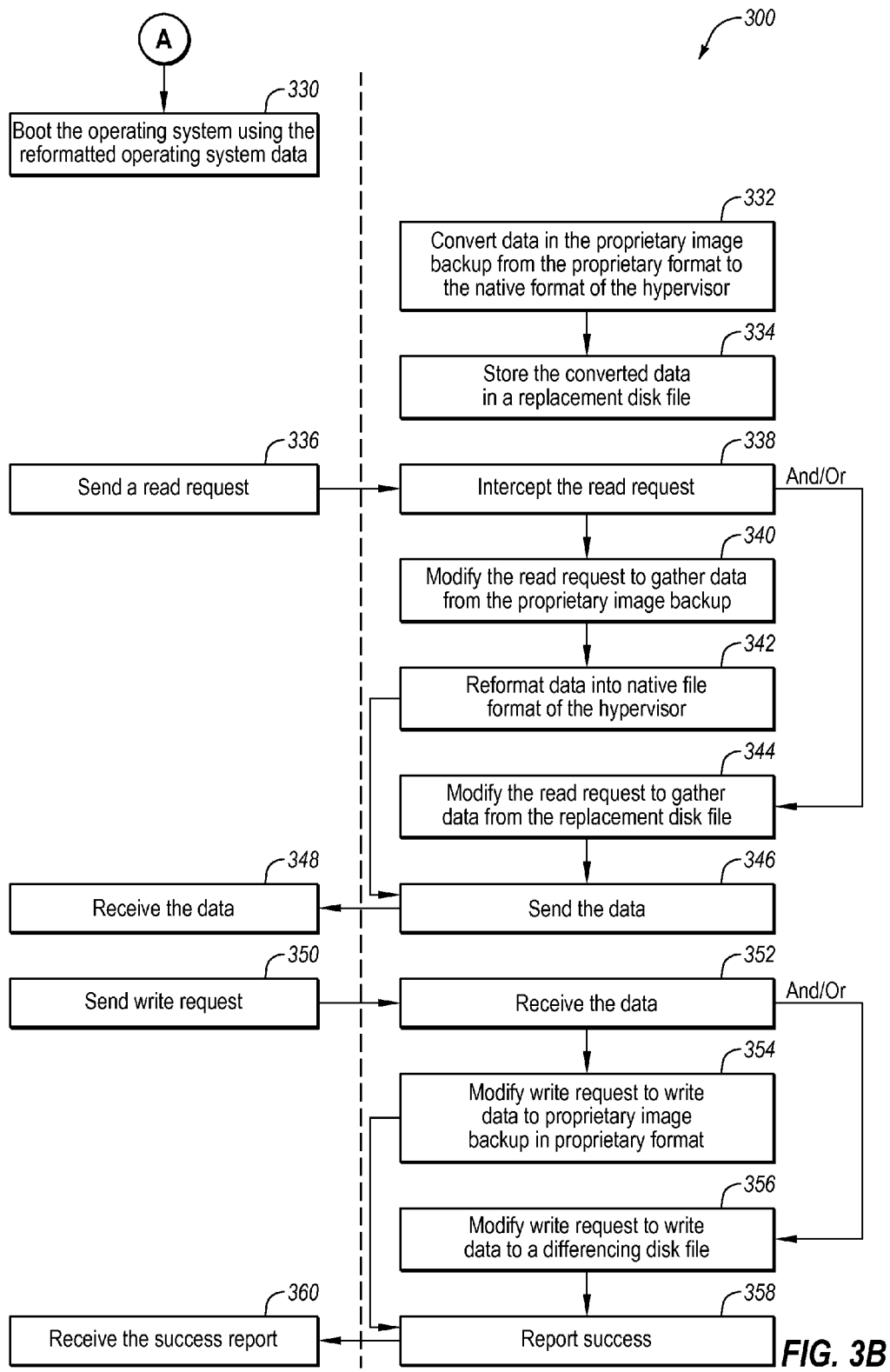

FIGS. 3A-3B are a schematic flowchart diagram of an example method 300 of exposing a proprietary image backup to a hypervisor as a disk file that is bootable by the hypervisor. The method 300 may be implemented, in at least some embodiments, by the hypervisor 102 and the filter module 110 of the system 100 of FIG. 1. For example, the hypervisor 102 and the filter module 110 may be configured as one or more programs stored on one or more non-transitory computer-readable media that are configured, when executed, to cause one or more processors to perform operations of exposing the proprietary image backup file 200 to the hypervisor 102 as a disk file that is bootable by the hypervisor 102, as represented by one or more of the steps 302-360 of the method 300. Although illustrated as discrete steps, various steps may be divided into additional steps, combined into fewer steps, reordered, or eliminated, depending on the desired implementation. The method 300 will now be discussed with reference to FIGS. 1-3B.

The method 300 may include a step 302 of identifying a proprietary image backup storing an operating system. For example, the filter module 110 of FIG. 1 may identify, at step 302, the proprietary image backup file 200 of FIG. 1 as being a proprietary backup image having a proprietary format and storing an operating system 204, as disclosed in FIG. 2.

The method 300 may include a step 304 of creating a plugin file corresponding to the proprietary image backup. For example, the filter module 110 of FIG. 1 may create, at step 304, the plugin file 122 of FIG. 1 that corresponds to the proprietary image backup file 200 of FIG. 1. Alternatively, another module, such as a kernel-mode or user-mode module that runs on the same host machine as the hypervisor 102 or that runs on another local or remote machine, may, at step 304, create the plugin file 122 that corresponds to the proprietary image backup file 200. As noted above, the proprietary image backup file 200 has a proprietary file format and the plugin file 122 has a plugin file format. Also noted above, the plugin file 122 may be stored in the storage 114 where the proprietary image backup file 200 is stored, or the plugin file 122 and/or the proprietary image backup file 200 may be stored in another local or remote storage. As illustrated in FIG. 1, the plugin file 122 may include a pointer that points to the proprietary image backup file 200. Additionally or alternatively, the plugin file 122 may be associated with the proprietary image backup file 200 using a data storage system that is external to the plugin file 122, such as a database that is stored elsewhere in the storage 114 or in another local or remote storage.

The method 300 may include a step 306 of reconfiguring the operating system to cause the operating system to be bootable when using hardware emulated by the hypervisor. For example, the hypervisor 102 may, at step 306, reconfigure the operating system 204 of FIG. 2 to cause the operating system 204 to be bootable when using hardware emulated by the hypervisor 102. This reconfiguration of the operating system 204 at step 306 may include modifying the operating system as stored in the proprietary image backup file 200. Alternatively, this reconfiguration may include leaving the operating system 204 as stored in the proprietary image backup file 200 unmodified and storing modifications to the operating system 204 in a location other than the proprietary image backup file 200, such as in a reconfigured disk file 250. The differences between the original proprietary image backup file 200 and the reconfigured disk file 250 may be stored by creating a differencing disk file associated with the plugin file 122 and storing the modifications to the operating system 204 in the differencing disk file.

This reconfiguration of the operating system 204 at step 306 may additionally or alternatively include patching the storage controller device driver(s) 210 of the operating system 204, patching the kernel 208 of the operating system 204, patching the input/output device driver(s) 212 of the operating system 204, patching boot code (such as the boot loader code 254) of the operating system 204, patching the partition structure 256 associated with the operating system 204, patching the drive identifier 258, patching a drive letter and/or a volume identifier of a volume that stores the operating system 204, or some combination thereof. It is understood that patching boot code may include patching boot code that is stored in boot sector(s), in a BIOS, in executable boot loader files, or some combination thereof.

The method 300 may include a step 308 of sending a file open request and a step 310 of intercepting the file open request. For example, the hypervisor 102 of FIG. 1 may, at step 308, send a file open request directed to the plugin file 122 and the filter module 110 may, at step 310, intercept the file open request. This interception of this request, and the interception of all other requests discussed herein, may be possible due to the filter module 110 sitting between the hypervisor 102 and the storage 114 where the plugin file 122 is stored, in any of the positions disclosed in FIG. 1, or in any combination of the positions disclosed in FIG. 1. In any such position, the filter module 110 is able to intercept, examine, and modify, if desired, all requests from the hypervisor 102 to the storage 114.

Continuing with the above example, even though the plugin file 122 has a plugin file format, the hypervisor 102 may nevertheless attempt to open the plugin file 122 because the plugin file may falsely appear to have a native file format. For example, a portion of a name attribute of the plugin file 122, such as the file extension of the name attribute of the plugin file 122, may falsely identify the plugin file 122 as having the native file format of the hypervisor 102. In this example, the hypervisor 102 may be a Microsoft® Hyper-V® hypervisor, the plugin file 122 may be named "vm.vhdx," and the proprietary image backup file 200 may be an SPF image backup file named "vm.spf" that is separate from the plugin file 122. The "vhdx" file extension falsely identifies the plugin file 122 as having the native VHDX file format of the Microsoft® Hyper-V® hypervisor 102. In reality, of course, the plugin file 122 may not contain the typical content and/or structure of a native VHDX file, but instead is in reality a plugin file that points to the corresponding SPF image backup file named "vm.spf" that is separate from the plugin file 122. Alternatively, the plugin file 122 may have the native file format, but may not yet be "filled up" with data, as discussed below in connection with step 334.

The method 300 may include a step 312 of determining that the plugin file has a plugin file format. For example, the filter module 110 may, at step 312, determine that the plugin file 312 has a plugin file format. This determination may be made in a variety of different ways. For example, the filter module 110 may determine that the plugin file 122 has a plugin file format by determining that metadata that identifies the plugin file 122 as having a plugin file format is present in the plugin file 122. Alternatively or additionally, the filter module 110 may determine that the plugin file 122 has a plugin file format by determining that the plugin file 122 is present in a list of files that have the plugin file format that is stored in a data storage system that is external to the plugin file 122, such as a database that is stored elsewhere in the storage 114 or in another storage. It is understood that the plugin file format may overlap or be identical, in at least some embodiments, with the native file format, as discussed below in connection with step 334.

The method 300 may include a step 314 of reporting success and a step 316 of receiving the success report. For example, the filter module 110 may, at step 314, respond to the previously received file open request with a report that the plugin file 122 was opened successfully, and the hypervisor 102 may, at step 316, receive the success report.

This reporting of success may be performed at steps 314 and 316 either after actually having opened the proprietary image backup file 200 or without actually having opened the proprietary image backup file 200. In practice, it has been discovered that at least some hypervisors perform many reads of metadata of a disk file without actually requesting disk data, and do so between several consecutive file open and file close requests on the disk files. This occurs most often when disk files are being attached to guest virtual machines, or when virtual machine configuration settings are being modified. Therefore, to improve performance, the user experience, and reduce resource usage, the filter module 110 may defer actually opening the proprietary image backup file 200 until absolutely necessary. This may involve storing sufficient metadata to respond to other reads of virtual machine disk file metadata within, and/or associated with, the plugin file 122 itself, so that such requests can be responded to without the typically-expensive operation of opening the proprietary image backup file 200.

After the performance of step 316, the hypervisor 102 may believe that a native hypervisor disk file having the native file format of the hypervisor 102 has been opened, even where the actual file that has been accessed is the plugin file 122 that has a plugin file format that may or may not coincide with the native file format. The plugin file 122 may be subsequently used by the filter module 110 to expose the proprietary image backup file 200 to the hypervisor 102 in the native file format of the hypervisor 102.

The method 300 may include a step 318 of sending read operations associated with an operating system boot and a step 320 of intercepting read operations associated with the operating system boot. For example, the hypervisor 102 of FIG. 1 may, at step 318, send read operations associated with a booting of the operating system 204 of FIG. 2, and the filter module 110 of FIG. 1 may, at step 320, intercept the read operations, such as file read operations or block read operations, associated with the booting of the operating system 204. The booting of the operating system 204 may involve the execution of boot code, such as the boot loader code 254, which may result in the read operations sent and intercepted at steps 318 and 320.

The method 300 may include a step 322 of gathering operating system data from the proprietary image backup. For example, the filter module 110 of FIG. 1 may, at step 322, gather data of the operating system 204 from the proprietary image backup file 200 or the reconfigured disk file 250 of FIG. 2.

The method 300 may include a step 324 of reformatting the operating system data into the native format of the hypervisor. For example, the filter module 110 of FIG. 1 may, at step 324, reformat the operating system data that was gathered at step 322 into the native format of the hypervisor 102 to cause the operating system data to appear to be gathered from a disk file formatted in the native format of the hypervisor 102.

The method 300 may include a step 326 of sending the reformatted operating system data and a step 328 of receiving the reformatted operating system data. For example, the filter module 110 of FIG. 1 may, at step 326, send the reformatted operating system data, and the hypervisor 102 may, at step 328, receive the reformatted operating system data.

The method 300 may include a step 330 of booting the operating system using the reformatted operating system data. For example, the hypervisor 102 of FIG. 1 may, at step 330, boot the operating system 204 of FIG. 2 using the reformatted operating system data received at step 328.

After the performance of the step 330, the hypervisor 102 of FIG. 1 on a host machine will have successfully created the guest virtual machine 108 by reconfiguring, using the filter module 110, the operating system 204 stored in the proprietary image backup file 200 to be bootable when using hardware emulated by the hypervisor 102 and then booting the reconfigured operating system 204, even though the hypervisor 102 may only be designed to be capable of creating guest virtual machines using disk files formatted in the native format of the hypervisor 102 and even though the hardware configuration emulated by the hypervisor 102 is different from the hardware configuration of the operating system 204 that was originally stored in the proprietary image backup file 200. The example methods disclosed herein therefore enable the hypervisor 102 to access and boot the operating system 204 of the proprietary image backup file 200 in the virtual machine 108.

Additionally, after the performance of the step 330, the hypervisor 102 will have been deceived by the filter module 110 to believe that read operations were successfully executed on a native hypervisor disk file having the native file format of the hypervisor 102, even though the actual file that has been read from is the proprietary image backup file 200 having a proprietary file format. This deception on the part of the filter module 110 allows the filter module 110 to expose the proprietary image backup file 200 to the hypervisor 102 in the native file format of the hypervisor 102, thereby expanding the types of disk files that can be effectively read by the hypervisor 102.

The method 300 may include a step 332 of reformatting data in the proprietary image backup from the proprietary format to the native format of the hypervisor. For example, the filter module 110 of FIG. 1 may, at step 332, reformat data in the proprietary image backup file 200 from the proprietary format to the native format of the hypervisor 102. The reformatting at step 332 may be performed in connection with intercepted read requests that are directed to the plugin file 122 or may be performed separately from any intercepted read request. Additionally, the reformatting at step 332 may be performed in connection with the reformatting performed at step 324.

The method 300 may include a step 334 of storing the reformatted data in a replacement disk file. For example, the filter module 110 of FIG. 1 may, at step 334, store the reformatted data in a replacement disk file. The replacement disk file may be a disk file that has the native format of the hypervisor 102. For example, the plugin file 122 may have the native format of the hypervisor 102 and may function as the replacement disk file. Alternatively, the replacement disk file may be separate from the plugin file 122. In either case, step 334 may include "filling up" the replacement disk file with the reformatted data. Then, once the data in the proprietary image backup file 200 has finished being reformatted and stored in the replacement disk file, at the conclusion of the step 334, the proprietary image backup file 200 can be replaced by the replacement disk file, and requests directed to the plugin file 122 that previously may have been serviced from proprietary image backup file 200 may subsequently be serviced from the replacement disk file.

In addition, even partial performance of the step 334 may enable the filter module 110 to respond to intercepted read requests by gathering data from the proprietary image backup file 200 and the replacement disk file in a load-balanced fashion, which may enable data to be gathered simultaneously from both the proprietary image backup file 200 and the replacement disk file to service the read requests. For example, even before the step 334 has completed, and the replacement disk file is only partially "filled up" with the reformatted data from the proprietary image backup file 200, the filter module 110 may service intercepted read requests by balancing the gathering of data between the proprietary image backup file 200 and the replacement disk file, which may speed up servicing of the intercepted read requests.

After the performance of the step 334, the filter module 110 may have successfully created and/or filled up the replacement disk file, which is a native hypervisor disk file of the hypervisor 102, enabling the virtual machine 108 to be maintained using the replacement disk file. Since the replacement disk file is a native hypervisor disk file, it may be more efficient for the hypervisor 102 to maintain the virtual machine 108 from the replacement disk file than it was from the proprietary image backup file 200 as the functionality of the filter module 110 may no longer be necessary for the hypervisor 102 to maintain the virtual machine 108.

The method 300 may include a step 336, in which a file read request is sent, and a step 338, in which the file read request is intercepted. For example, the hypervisor 102 may, at step 336, send a file read request directed to the plugin file 122 and the filter module 110 may, at step 338, intercept the file read request.

After step 338, the method 300 may include a step 340, in which the read request is modified to gather data from a proprietary disk file. For example, the filter module 110 may, at step 340, modify the read request to direct that data be gathered from the proprietary image backup file 200 instead of from the plugin file 122. This modification may be enabled by the pointer in the plugin file 122 and thereby indicates that the proprietary image backup file 200 should be the actual target of any read and/or write requests sent by the hypervisor 102 to the plugin file 122.

The method 300 may include a step 342, in which the data is reformatted into a native file format of the hypervisor. For example, the filter module 110 may, at step 342, reformat the data that was gathered in response to the modified request at step 340 into the native file format of the hypervisor 102. This reformatting of the data may be intended to make the data appear to the hypervisor 102 to have been gathered from a native hypervisor disk file due to being formatted in the native file format of the hypervisor 102.

Additionally or alternatively, after step 338, the method 300 may include a step 344 of modifying the read request to gather data from the replacement disk file. For example, the filter module 110 may, at step 344, modify the read request that was intercepted at step 338 to gather data that was originally stored in the proprietary image backup file 200, but was subsequently reformatted into the native file format of the hypervisor 102 and stored in the replacement disk file.

The method 300 may include a step 346, in which the gathered data is sent, and a step 348, in which the gathered data is received. For example, the filter module 110 may, at step 346, send the gathered data, and the hypervisor 102 may, at step 348, receive the gathered data.

After the performance of step 348, the hypervisor 102 will have been deceived by the filter module 110 to believe that a read request was successfully executed on a native hypervisor disk file having the native file format of the hypervisor 102 even though the actual file that has been read from, or that was originally read from, is the proprietary image backup file 200 having a proprietary file format, and/or the read request will have been successfully executed on the replacement file.

The method 300 may include a step 350, in which a write request is sent, and a step 352, in which the write request is intercepted. For example, the hypervisor 102 may, at step 350, send a write request directed to a particular location in the plugin file 122 and the filter module 110 may, at step 352, intercept the write request.

After step 352, the method 300 may include a step 354, in which the write request is modified to write the data to a location in the proprietary disk file in the proprietary file format. For example, the filter module 110 may, at step 354, modify the write request to direct that data be written to a location in the proprietary image backup file 200 instead of to the plugin file 122.

Additionally or alternatively, after step 352, the method 300 may include a step 356 of modifying the write request to write data to a differencing disk file. For example, the file system 112 may, at step 356, write the data from the write request intercepted at step 352 to a difference disk file. The difference disk file may be created having a native file format. The differencing disk file may be associated with the plugin file 122.

The differencing disk file may be facilitated where the hypervisor 102 is configured with native snapshotting/differencing-disk capability to itself handle all write requests of a guest virtual machine by performing the write requests on a differencing disk file. For example, where the hypervisor 102 supports the creation of differencing disk files, which are snapshots of a disk file, the filter module 110, or other module of the system 100, can instruct the hypervisor 102 to create a differencing disk associated with the plugin file 122. A differencing disk file may be similar in some respects to an incremental image backup file, such as a StorageCraft® ShadowProtect® Incremental (SPI) image backup file. However unlike SPI image backup files, which are updated with sequentially-increasing offsets, differencing disk files may permit random-offset writes of virtual machine disk data. After the creation of the differencing disk file, all writes of the guest virtual machine 108 to the plugin file 122 may instead be written by the hypervisor 102 to the differencing disk file. The differencing disk file may have a native file format, such as a VHDX or VMDK file format. In this example, all of the write requests from the guest virtual machine 108 may be handled by the hypervisor 102 itself and are sent directly to the differencing disk file. The hypervisor 102 in this example may continue to issue read requests to the plugin file 122 but direct all write requests to the differencing disk file.

The method 300 may include a step 358 of reporting success and step 360 of receiving the success report. For example, the filter module 110 may, at step 358, report success and the hypervisor 102 may, at step 360, receive the success report.

After the performance of step 360, the hypervisor 102 will have been deceived by the filter module 110 to believe that a write request was successfully executed on a native hypervisor disk file having the native file format of the hypervisor 102 even though the actual file that has been written to is the proprietary image backup file 200 having a proprietary file format, or the write request will have been successfully executed on a differencing disk file.

It is understood that the steps of the method 300 performed in the examples above by the filter module 110 may be performed by a module other than the filter module 110, such as a kernel-mode or user-mode module that runs on the same host machine as the hypervisor 102.

It is further understood that each of the steps discussed herein that involve "modifying" a request may instead be implemented by replacing, and/or associating, the request with one or more new request(s) that is/are configured to accomplish the same end result as a "modified" request. For example, a "modification" of a read request may involve queuing the read request and initiating an associated read request to a proprietary disk file. The data received in response to the associated read request may then be filled into the queued read request's buffer, such as by copying the associated read request's buffer into the buffer for the queued read request. In this example, both the queued read request and the associated read request may use a shared buffer or they may have their own distinct buffers.

The embodiments described herein may include the use of a special-purpose or general-purpose computer including various computer hardware or software modules or filters, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general-purpose computer, special-purpose computer, or virtual computer such as a virtual machine. Combinations of the above may also be included within the scope of computer-readable media.

Computer-executable instructions comprise, for example, instructions and data which cause a general-purpose computer, special-purpose computer, or virtual computer such as a virtual machine to perform a certain function or group of functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" or "filter module" may refer to software objects or routines that execute on a computing system. The different modules or filter modules described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A method of exposing a proprietary image backup to a hypervisor as a disk file that is bootable by the hypervisor, the method comprising:
   identifying the proprietary image backup having a proprietary format and storing an operating system;
   identifying a plugin file corresponding to the proprietary image backup;
   reconfiguring the operating system to cause the operating system to be bootable when using hardware emulated by the hypervisor;
   gathering operating system data from the proprietary image backup;
   reformatting the operating system data into a native format of the hypervisor to cause the operating system data to appear to be gathered from a disk file formatted in the native format of the hypervisor; and
   booting the operating system in a virtual machine of the hypervisor.

2. The method as recited in claim 1, wherein a file extension of a name attribute of the plugin file falsely identifies the plugin file as having the native format of the hypervisor.

3. The method as recited in claim 1, further comprising:
   intercepting read requests directed to the plugin file; and
   responding to the read requests with data gathered from the proprietary image backup after the data is reformatted into the native format of the hypervisor.

4. The method as recited in claim 1, further comprising:
   creating a differencing disk file associated with the plugin file;
   receiving write requests; and
   directing the write requests to the differencing disk file.

5. The method as recited in claim 1, wherein the reconfiguring of the operating system includes modifying the operating system as stored in the proprietary image backup.

6. The method as recited in claim 1, wherein the reconfiguring of the operating system includes:
   leaving the operating system as stored in the proprietary image backup unmodified; and
   storing modifications to the operating system in a location other than the proprietary image backup.

7. The method as recited in claim 6, wherein the storing of the modifications to the operating system in the location other than the proprietary image backup includes:
   creating a differencing disk file associated with the plugin file; and
   storing the modifications to the operating system in the differencing disk file.

8. The method as recited in claim 1, wherein the reconfiguring of the operating system includes patching a storage controller device driver of the operating system.

9. The method as recited in claim 1, wherein the reconfiguring of the operating system includes patching a kernel of the operating system.

10. The method as recited in claim 1, wherein the reconfiguring of the operating system includes patching an input/output device driver of the operating system.

11. The method as recited in claim 1, wherein the reconfiguring of the operating system includes patching boot code of the operating system.

12. The method as recited in claim 1, wherein the reconfiguring of the operating system includes patching a partition structure associated with the operating system.

13. The method as recited in claim 1, wherein the reconfiguring of the operating system includes patching a drive letter and/or volume identifier of a volume that stores the operating system.

14. The method as recited in claim 1, further comprising:
   storing the reformatted operating system data in a replacement disk file formatted in the native format of the hypervisor;
   reformatting data in the proprietary image backup from the proprietary format to the native format of the hypervisor; and
   storing the reformatted data in the replacement disk file.

15. The method as recited in claim 14, further comprising:
   intercepting read requests directed to the plugin file; and
   responding to the read requests by gathering data from the proprietary image backup and the replacement disk file in a load-balanced fashion to cause data to be gathered simultaneously from both the proprietary image backup and the replacement disk file to service the read requests.

16. The method as recited in claim 14, wherein the replacement disk file is the plugin file.

17. The method as recited in claim 16, further comprising:
servicing requests directed to the plugin file from the plugin file once the data in the proprietary image backup has finished being reformatted and stored in the plugin file.

18. The method as recited in claim 1, wherein the proprietary image backup is an image backup of a volume of physical storage of a physical machine.

19. One or more non-transitory computer-readable media storing one or more programs that are configured, when executed, to cause one or more processors to perform the method of claim 1.

* * * * *